(12) United States Patent
Dubas (10) Patent No.: US 9,701,269 B1
(45) Date of Patent: Jul. 11, 2017

(54) WHEEL GUARD

(71) Applicant: Bryan D. Dubas, Fullerton, NE (US)

(72) Inventor: Bryan D. Dubas, Fullerton, NE (US)

( * ) Notice: Subject to any disclaimer, the term of this patent is extended or adjusted under 35 U.S.C. 154(b) by 0 days.

(21) Appl. No.: 15/252,992

(22) Filed: Aug. 31, 2016

Related U.S. Application Data (63) Continuation-in-part of application No. 14/822,424, filed on Aug. 10, 2015, now Pat. No. 9,566,926.

(51) Int. Cl.
*B60B 33/00* (2006.01)
*B60R 19/54* (2006.01)
*B60R 19/00* (2006.01)

(52) U.S. Cl.
CPC ........ *B60R 19/54* (2013.01); *B60R 2019/002* (2013.01)

(58) Field of Classification Search
CPC ... B60T 3/00; B60T 1/14; B60P 3/077; B60B 33/0049; Y10T 16/216; B60R 19/54
USPC ....................................................... 16/18 CG
See application file for complete search history.

(56) References Cited

U.S. PATENT DOCUMENTS

| 394,310 | A | * | 12/1888 | Sullivan | .............. B60B 33/0002 |
| | | | | | 16/18 CG |
| 2,046,384 | A | | 7/1936 | Katcher | |
| 2,450,062 | A | * | 9/1948 | Voss | ........................ A47L 9/009 |
| | | | | | 16/18 CG |
| 2,471,958 | A | | 5/1949 | Humphreys | |
| 2,830,545 | A | * | 4/1958 | Robinson | ................ B60B 33/00 |
| | | | | | 105/170 |
| 3,345,675 | A | * | 10/1967 | Haydock | ................. B60B 33/00 |
| | | | | | 16/18 CG |
| 3,441,974 | A | * | 5/1969 | Dean | ..................... A47B 91/028 |
| | | | | | 16/18 R |
| 4,025,099 | A | | 5/1977 | Virden | |
| 4,700,430 | A | * | 10/1987 | Raftery | .................. A47B 91/06 |
| | | | | | 16/18 CG |
| 4,800,617 | A | * | 1/1989 | Yeh | ...................... B60B 33/0089 |
| | | | | | 16/18 CG |
| 5,001,808 | A | * | 3/1991 | Chung | .................... B60B 33/06 |
| | | | | | 16/18 CG |
| 5,134,753 | A | * | 8/1992 | Rekuc | ....................... A45C 5/14 |
| | | | | | 16/18 CG |
| 5,371,920 | A | | 12/1994 | Rainville | |
| 5,615,450 | A | | 4/1997 | Butler | |
| 5,873,144 | A | | 2/1999 | Tupper et al. | |
| 7,810,769 | B2 | * | 10/2010 | Williams | ............... A47B 91/00 |
| | | | | | 248/188.1 |
| 8,484,801 | B2 | * | 7/2013 | Li | ............................. B60B 7/02 |
| | | | | | 16/18 CG |

(Continued)

*Primary Examiner* — Thomas Irvin
(74) *Attorney, Agent, or Firm* — Dennis L. Thomte; Thomte Patent Law Office LLC (57) ABSTRACT

A wheel guard or skirt is disclosed for use with a wheel of a machine or appliance. The wheel guard is designed to push an obstruction such as a wire, cable or other debris away from the wheel as the machine is moved along a floor. The wheel guard is designed to push objections away from the wheel to prevent the wheel from running over the obstruction. The wheel guard may be of one-piece construction or multiple-piece construction. The wheel guard includes means which causes the wheel guard to move upwardly with the wheel to which it is attached. The wheel guard includes means to limit the upward movement of the wheel guard with respect to the wheel.

5 Claims, 12 Drawing Sheets

(56) References Cited

U.S. PATENT DOCUMENTS 8,904,597 B2 * 12/2014 Long .................. B60B 33/0015
                                                                        16/18 CG
9,108,462 B1 *  8/2015 Stone ................. B60B 33/0023

\* cited by examiner

WHEEL GUARD

CROSS REFERENCE TO RELATED APPLICATION

This is a Continuation-In-Part Application of application Ser. No. 14/822,424 filed Aug. 10, 2015 entitled WHEEL GUARD.

BACKGROUND OF THE INVENTION

Field of the Invention

This invention relates to wheel guards or skirts for the wheels of a machine or appliance such as a portable welding machine, hospital appliance, etc., intended to clear obstacles such as electrical wires, cables, or debris from the rolling path of the wheels thereof so as to prevent obstruction of the rolling movement of the wheels.

Description of the Related Art

Many machines, such as portable welding machines, are mounted on a pair of caster wheels at the forward end thereof and a pair of conventional wheels at the rearward end thereof. In some welding machines, a pair of caster wheels are mounted at the forward end of the welding machine and a pair of caster wheels are mounted at the rearward end of the welding machine. In many welding facilities, the floor thereof is littered with electrical wires, cables, etc., which impede the movement of the wheeled welding machine. Further, many appliances such as hospital carts, IV supports, etc., suffer the same problem.

Attempts have been made to reduce or eliminate these problems. However, the prior art devices are believed to be difficult to mount on the wheels and do not perform satisfactorily. Further, the prior art devices are not usable in many situations such as where the caster wheels have locking devices associated therewith. Further, in some situations, the prior art devices cannot be used when the associated wheel is positioned closely adjacent the welding machine, appliance, etc. Additionally, some of the prior art devices are difficult to install and are difficult to service or remove. Even more particularly, many of the prior art devices are ineffective.

The co-pending application truly represents an improvement in the wheel guard art. The instant invention relates to a further improvement in the wheel guard art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In the co-pending application, a guard or a skirt is disclosed for a wheel which is rotatably mounted on a machine with the wheel having a horizontal axis. The machine may be a welding machine or other portable machine or appliance. The guard of the co-pending application includes a horizontally disposed first base member having a first end, a second end, a lower end and an upper end. The first base member is positioned at one side of the wheel. A horizontally disposed second base member having a first end, a second end, a lower end and an upper end is horizontally spaced from the first base member and is positioned at the other side of the wheel. The upper ends of the first and second base members dwell in a plane below the horizontal axle of the associated wheel.

An upstanding first end member having a lower end, an upper end, a first side, a second side, an outer end wall with lower and upper ends, and an inner end wall with lower and upper ends is also provided. The outer end wall of the first end member extends upwardly and inwardly from the lower end thereof to the upper end thereof. The inner end wall of the first end member extends upwardly and inwardly from the lower end thereof to the upper end thereof. The lower end of the first end member is positioned between the first ends of the first and second base members. The upper end of the first end member dwells in a plane above the upper ends of the first and second base members. The guard also includes an upstanding second end member having a lower end, an upper end, a first side, a second side, an outer end wall with upper and lower ends, and an inner end wall with lower and upper ends. The outer end wall of the second end member extends upwardly and inwardly from the lower end thereof to the upper end thereof. The inner end wall of the second end member extends upwardly and inwardly from the lower end thereof to the upper end thereof. The lower end of the second end member is positioned between the second ends of the first and second base members. The upper end of the second end member dwells in a plane above the upper ends of the first and second base members. The upper ends of the inner end walls of the first and second end members dwell in a plane above the horizontal axis of the wheel. The upper ends of the inner end walls of the first and second end members are spaced-apart a distance which is less than the diameter of the associated wheel.

In the preferred embodiment of the co-pending application, the first ends of the first and second base members are selectively removably secured to the first end member and wherein the second ends of the first and second base members are selectively removably secured to the second end member. Preferably, the first ends of the first and second base members are selectively removably snap-fitted to the first end member and wherein the second ends of the first and second base members are selectively removably snap-fitted to the second end member.

In another embodiment of the co-pending application, the guard may be comprised of a one-piece molded guard. In another embodiment of the co-pending application, the components of the wheel guard may be screwed together or bolted together.

In the present invention, two additional embodiments of the wheel guard are disclosed. In the first embodiment of the instant invention, the entire wheel guard is comprised of two pieces which are secured together to provide the instant invention. In the second embodiment, the wheel guard is comprised of a unitary one-piece molded construction. In both of the embodiments of the instant invention, the upper ends of the first and second end members or portions are spaced-apart a distance which is less than the diameter of the wheel to which it is affixed. In both of the embodiments of the instant invention, the lower end of the guard has a rectangular opening formed therein which receives the lower end of the wheel. The rectangular opening has a length less than the diameter of the wheel to restrict upward movement of the wheel guard with respect to the wheel should the guard engage an obstruction.

A principal object of the invention is to provide an improved guard or skirt for a caster wheel or a conventional wheel mounted on a portable machine such as a welding machine, appliance or the like.

A further object of the invention is to provide a guard of the type described which prevents the wheels of the machine from rolling over cables, wires, debris, etc.

A further object of the invention is to provide a wheel guard of the type described which may be used with a caster wheel having a lock or a conventional caster wheel or a conventional wheel.

A further object of the invention is to provide a wheel guard of the type described which is easily mounted on a wheel.

A further object of the invention is to provide a wheel guard which may be of a one-piece plastic molded construction.

Yet another object of the invention is to provide a wheel guard which may be comprised of multiple components.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENTS

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the wheel guard of co-pending application. The wheel guard 10 of the co-pending application as seen in FIGS. 1-7 thereof will be described in detail prior to the instant invention being described. The wheel guard 10 is preferably constructed of a plastic material. The wheel guard 10 is designed so as to be usable with a caster wheel, a caster wheel with a brake, and a conventional wheel. Although the drawings illustrate the wheel guard 10 as being of four-piece construction, the wheel guard 10 may be a single piece plastic molded article, a two-piece plastic molded article, or a multiple piece article. The drawings illustrate the wheel guard being used with caster wheels 12 and conventional wheels 14 on a welding machine 15. The size of wheel guard 10 will depend on the size of the wheel. Each of the wheels have a horizontal axle A.

Guard 10 of the co-pending application includes an elongated base member 16 having a curved first end 18, a curved second end 20, a lower end 22, an upper end 24, an outer side 26 and an inner side 28. The outer end of first end 18 has a notch 19 formed therein. The outer end of second end 20 has a notch 21 formed therein. As seen, the outer side 26 of base member 16 is curved so as to extend upwardly and inwardly from its lower end 22 to its upper end 24.

Figure 3:
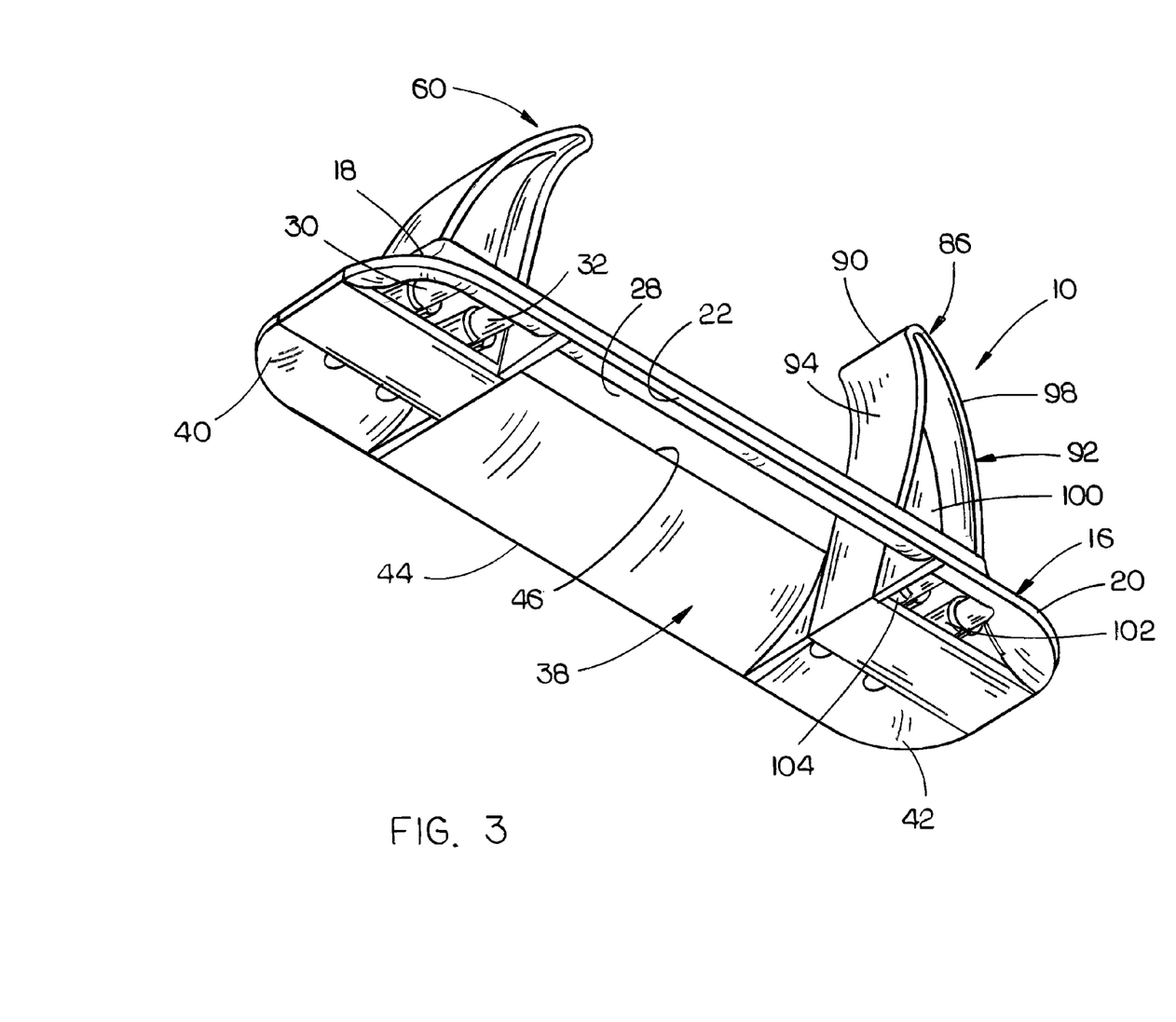
FIG. 3 is a lower perspective view of the wheel guard of the co-pending application.
Figure 5:
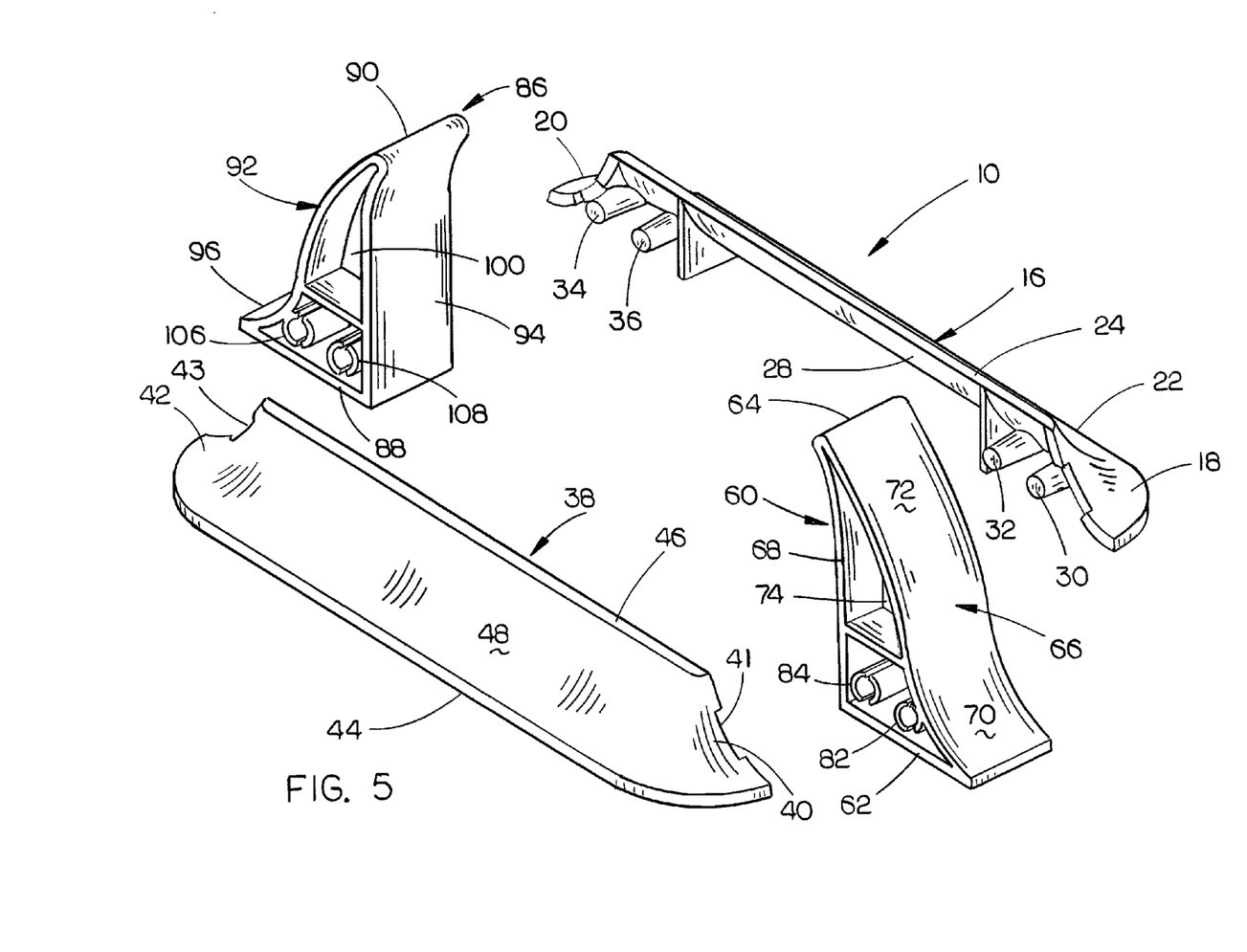
FIG. 5 is an exploded perspective view of the wheel guard of the co-pending application as seen from the opposite side of FIG. 4.
Figure 6:
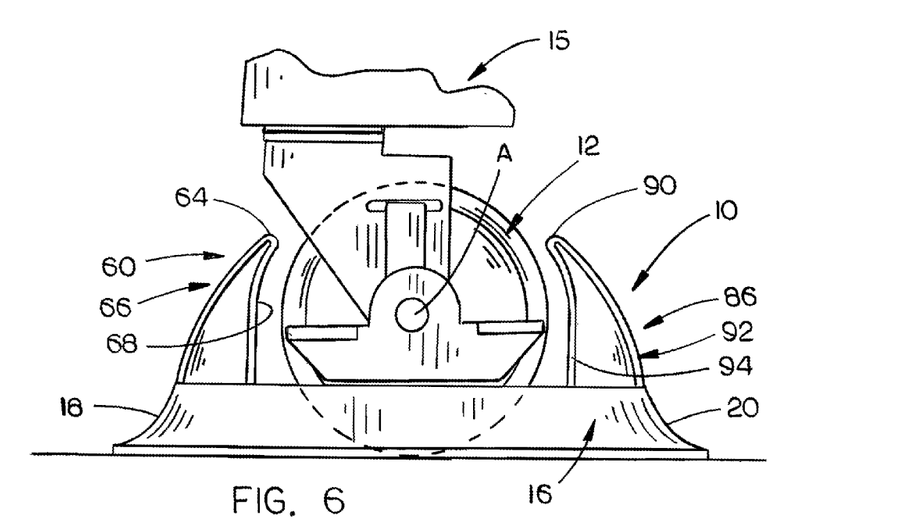
FIG. 6 is a partial side elevational view illustrating the wheel guard of the co-pending application resting on a floor and embracing the wheel of the machine.
Figure 7:
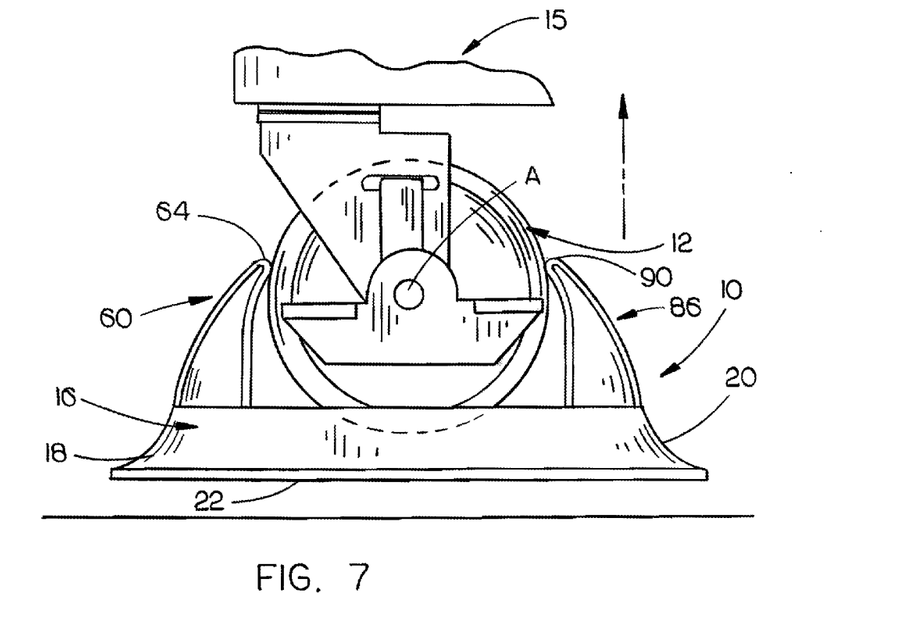
FIG. 7 is a view similar to FIG. 6 except that the machine has been moved upwardly with respect to the floor with the wheel guard of the co-pending application moving upwardly with the wheel.

As seen in FIGS. 3 and 5 of the co-pending application, a pair of spaced-apart pegs, stubs or studs 30 and 32 extend horizontally inwardly from the inner side 28 of base member 16 inwardly of end 18 thereof. Preferably, studs 30 and 32 are tapered as seen in FIG. 5. A pair of spaced-apart pegs, stubs or studs 34 and 36 extend horizontally inwardly from the inner side 28 of base member 16 inwardly of end 20 thereof. Preferably, studs 34 and 36 are tapered as seen in FIG. 5.

Guard 10 of the co-pending application also includes an elongated base member 38 having a curved first end 40, a curved second end 42, a lower end 44, an upper end 46, an outer side 48 and an inner side 50. The outer end of first end 40 has a notch 41 formed therein. The outer end of second end 42 has a notch 43 formed therein. As seen, the outer side 48 of base member 38 is curved so as to extend upwardly and inwardly from its lower end 44 to its upper end 46.

Figure 4:
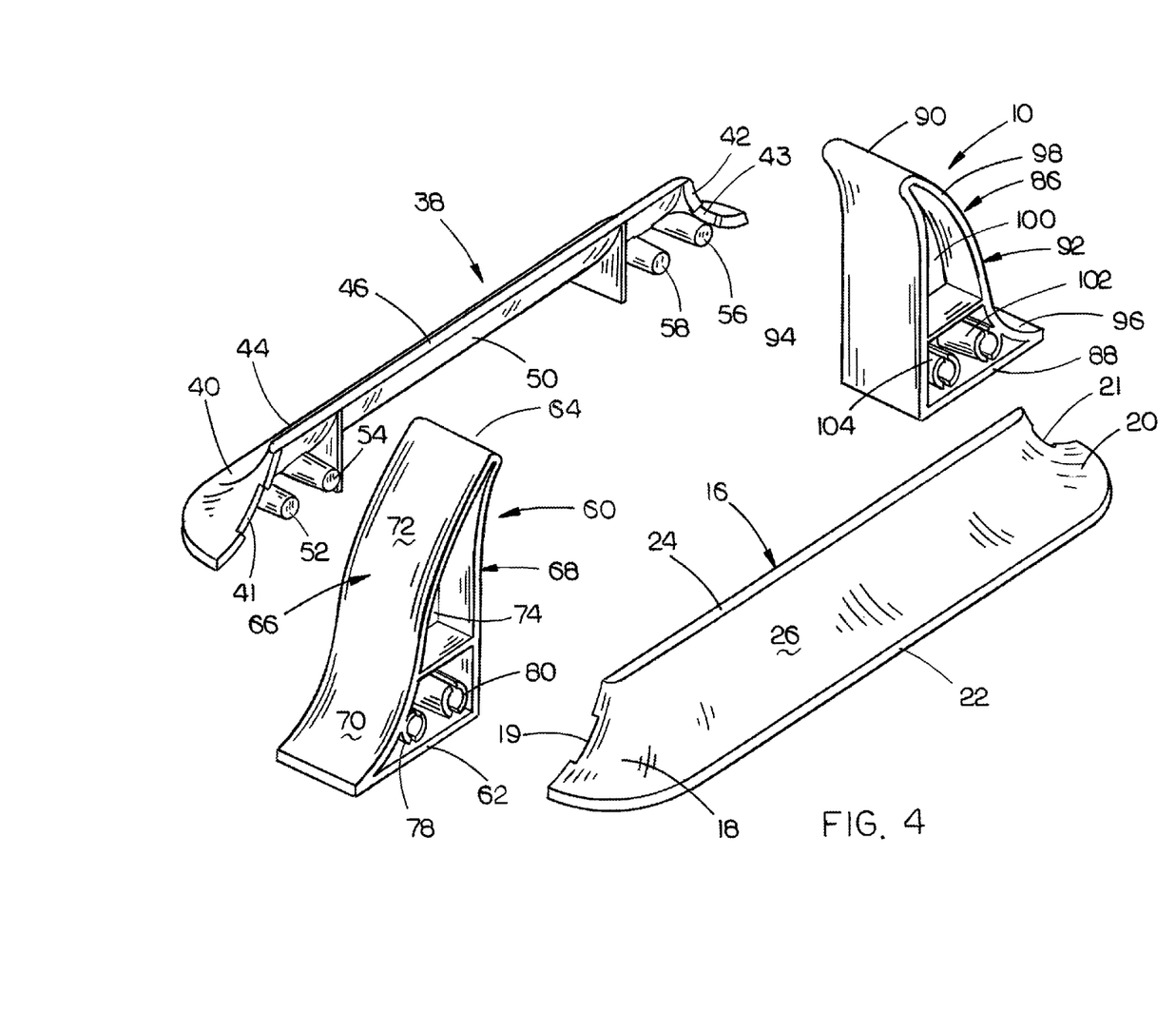
FIG. 4 is an exploded perspective view the wheel guard of the co-pending application.

As seen in FIG. 4, a pair of spaced-apart stubs, pegs or studs 52 and 54 extend horizontally inwardly from the inner side 50 of base member 38 inwardly of end 40 thereof. Preferably, studs 52 and 54 are tapered as seen in FIG. 4. A pair of spaced-apart stubs, pegs or studs 56 and 58 extend horizontally inwardly from the inner side 50 of base member 38 inwardly of end 42. Preferably, studs 56 and 58 are tapered as seen in FIG. 4.

The numeral 60 in the co-pending application refers to an upstanding end member which is positioned between the ends 18 and 40 of base members 16 and 38 respectively. End member 60 is described as having a flat lower end 62, an upper end 64, a curved outer side wall 66 and an inner side wall 68 which is curved at its upper end. As seen, the outer side wall 66 of end member 60 has a curved portion 70 at its lower end. The outer side wall 66 of end member 60 has a curved portion 72 which extends upwardly and inwardly from curved portion 70. End member 60 has a central partition wall 74 which extends between the outer side wall 66 and the inner side wall 68. A pair of hollow tubes 78 and 80 extend horizontally outwardly from one side of wall 74 at the lower end thereof. As will be explained hereinafter, the outer end of tube 78 is configured to receive stud 30 therein and the outer end of tube 80 is configured to receive stud 32 therein. A pair of hollow tubes 82 and 84 extend horizontally outwardly from the other side of wall 74 at the lower end thereof as will be explained hereinafter. The outer end of tube 82 is configured to receive stud 52 of base member 38 therein and the outer end of tube 84 is configured to receive stud 54 of base member 38 therein.

The numeral 86 in the co-pending application refers to an upstanding end member which is positioned between the ends 20 and 42 of base members 16 and 38 respectively as seen in the co-pending application. End member 86 is described as having a flat lower end 88, on upper end 90, a curved outer side wall 92, and an inner side wall 94 which is curved at its upper end. As seen, the outer side wall 92 of end member 86 has a curved portion 96 at its lower end. The outer side wall 92 of end member 86 has a curved portion 98 which extends upwardly and inwardly from curved portion 96. End wall member 86 has a central partition wall 100 which extends between the outer side wall 92 and the inner side wall 94. End member 86 includes a pair of hollow tubes 102 and 104 which extend horizontally outwardly from one side of wall 100. The outer end of tube 102 is configured to receive stud 34 therein and the outer end of tube 104 is configured to receive stud 36 therein. A pair of hollow tubes 106 and 108 extend horizontally outwardly from the other side of wall 100 at the lower end thereof as will be explained hereinafter. The outer end of tube 106 is configured to receive stud 56 therein and the outer end of tube 108 is configured to receive stud 58 therein.

The wheel guard 10 of the co-pending application is assembled and mounted on the machine 15 as will now be described. End members 60 and 86 are positioned at the inner side of base member 16 so that tubes 78, 80, 102 and 104 are aligned with studs 30, 32, 34 and 36 respectively. The end members 60 and 86 are then moved inwardly towards base member 16 so that the studs 30, 32, 34 and 36 are snap-fitted into tubes 78, 80, 102 and 104 respectively. The base member 16 with the end members 60 and 86 attached thereto are then placed on the floor at one side of the wheel so that the lower end 62 of base member 16 and the lower ends 62 and 88 of end members 60 and 86 rest on the floor. At that point, the base member 16 and the end members 60 and 86 will partially surround the wheel. At that time, the upper ends 64 and 90 of end members 60 and 86 respectively will be positioned above the rotational axis of the wheel. At that point, the distance between the upper ends 64 and 90 of end members 60 and 86 respectively will be less than the diameter of the associated wheel.

The base member 38 is then positioned at the other or inner side of the wheel so that the lower end of base member 38 rests on the floor and so that the studs 52, 54 56, and 58 are aligned with the tubes 78, 80, 106 and 108 respectively. The base member 38 is then moved inwardly with respect to end members 60 and 86 so that the studs 52, 54, 56 and 58 are snap-fitted into the tubes 78, 80, 106 and 108 respectively.

A second way of attaching the wheel guard 10 of the co-pending application to the wheel is to first assemble the wheel guard 10 by securing the base member 16, the base member 38, and end members 60 and 86 together. The assembled wheel guard 10 is then positioned on the floor in its upright position. The machine 15 is then raised and positioned so that the associated wheel is positioned directly above the wheel guard 10. The machine 15 is then lowered so that the wheel engages the upper ends of the end members 60 and 86 and deflects the upper ends of the end members 60 and 86 outwardly so the wheel passes downwardly into the wheel guard. This mounting procedure will also be used if the wheel guard 10 is of one-piece construction.

Figure 1:
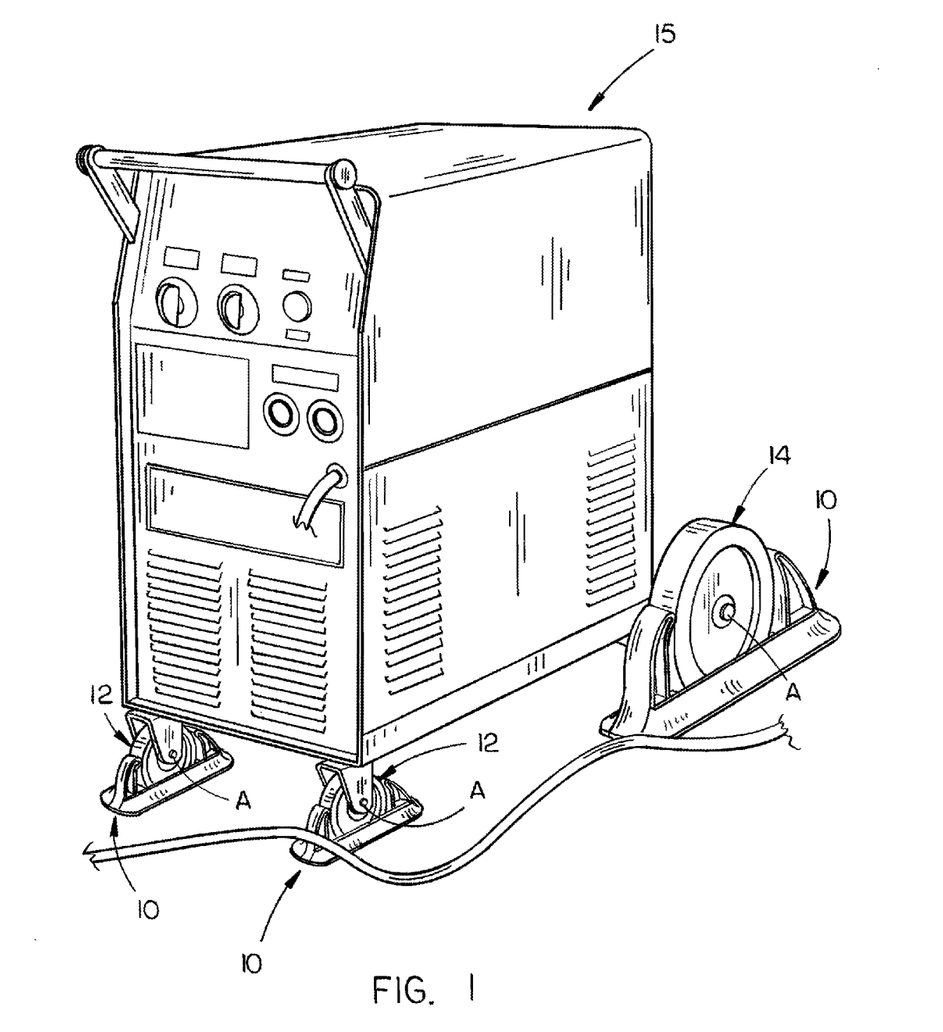
FIG. 1 is a perspective view of a welding machine having caster wheels and conventional wheels mounted thereon with the wheel guard of the co-pending application mounted on the wheels thereof.
Figure 2:
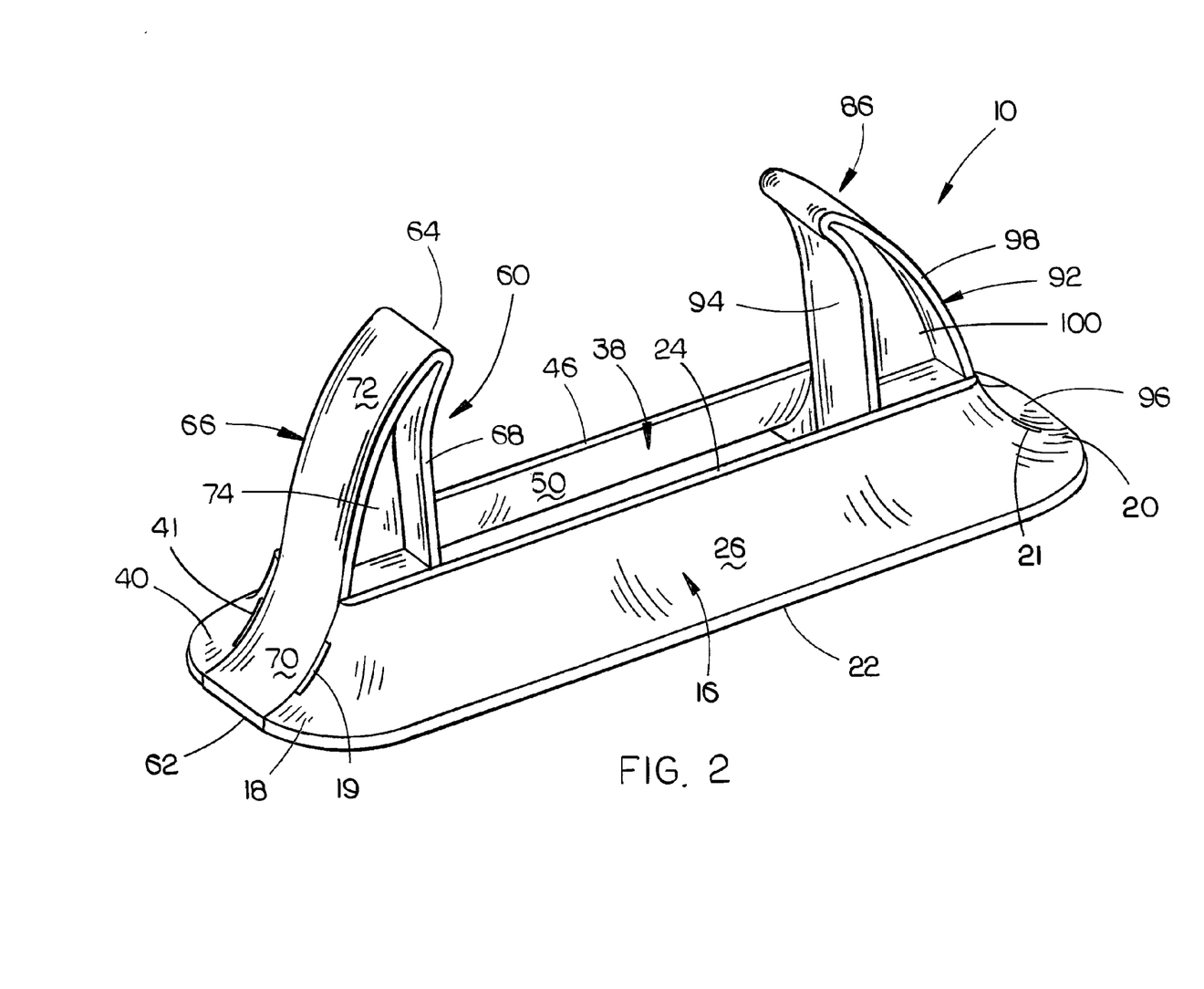
FIG. 2 is a perspective view of the wheel guard of the co-pending application.

With the wheel guards 10 mounted on the wheels 12 and 14, if the machine 15 is moved forwardly, the wheel guards 10 on the caster wheel 12, upon engaging a wire or cable, as seen in FIG. 1, the wheel guard 10 will push the wire or cable forwardly or laterally from the machine 15 so that the wheels thereof do not have to pass over the wire or cable. If the machine 15 is moved rearwardly, the wheel guards 10 on the wheels 14, upon engaging a wire or cable, the wheel guards 10 will push the wire or cable rearwardly or laterally from the machine 15 so that the wheels thereof do not have to pass over the wire or cable.

The components of the wheel guard of the co-pending application may also be screwed together or bolted together. The instant invention will now be described.

Figure 11:
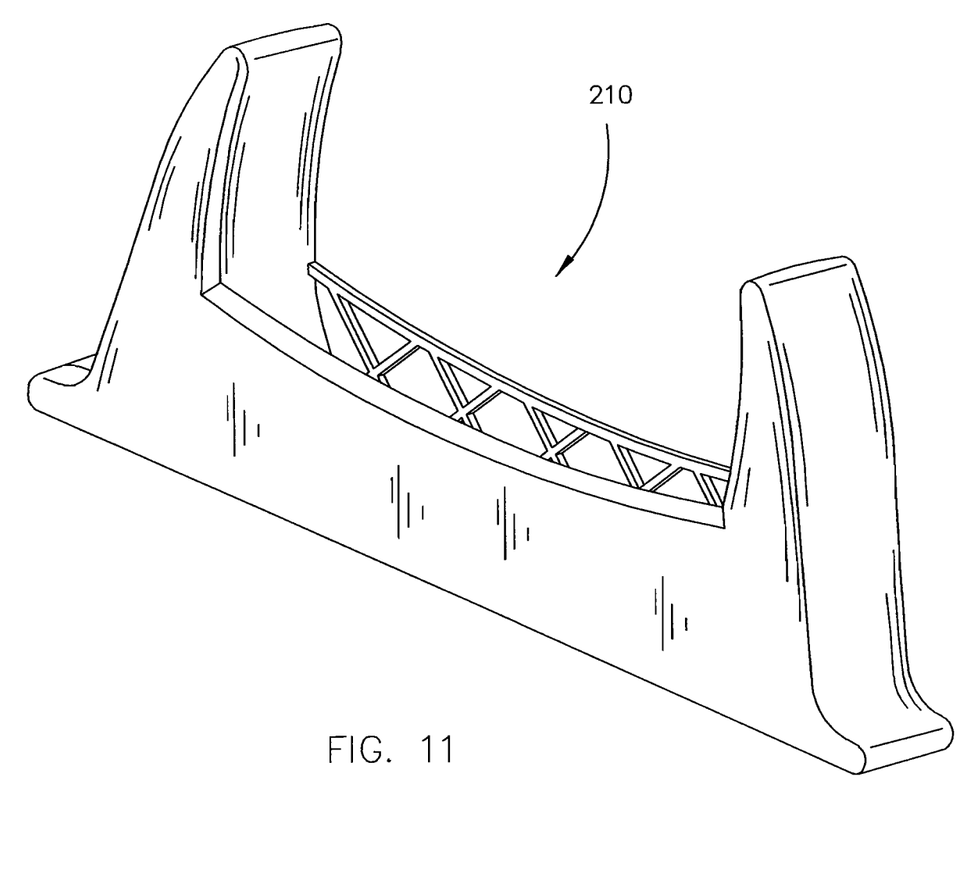
FIG. 11 is a top perspective view of the one-piece wheel guard of this invention.

FIGS. 8-14 illustrate the two wheel guards of the instant invention. The wheel guard illustrated in FIGS. 8-10 and 12-14 is designated by the reference numeral 110. The wheel guard illustrated in FIG. 11 is designated by the reference numeral 210. The wheel guards 110 and 210 are preferably comprised of a plastic material. The wheel guards 110 and 210 are designed so as to be usable with a caster wheel, a caster wheel with a brake and a conventional wheel.

The wheel guard 110 of FIGS. 8-10 and 12-14 is shown as being of two-piece construction. The wheel guard 210 is comprised of a unitary one-piece construction. The wheel guard 110 could be constructed with more than two pieces. In other words, the wheel guard 110 could be formed from multiple pieces such as four-piece construction or could be of six-piece construction. The drawings illustrate the wheel guard 110 as being used with a caster wheel 12 of a welding machine 15 in the same manner as depicted in FIGS. 1-7. The size of the wheel guard 110 will depend on the size of the wheel 12. Each of the wheels 12 have a horizontal axis A.

Figure 8:
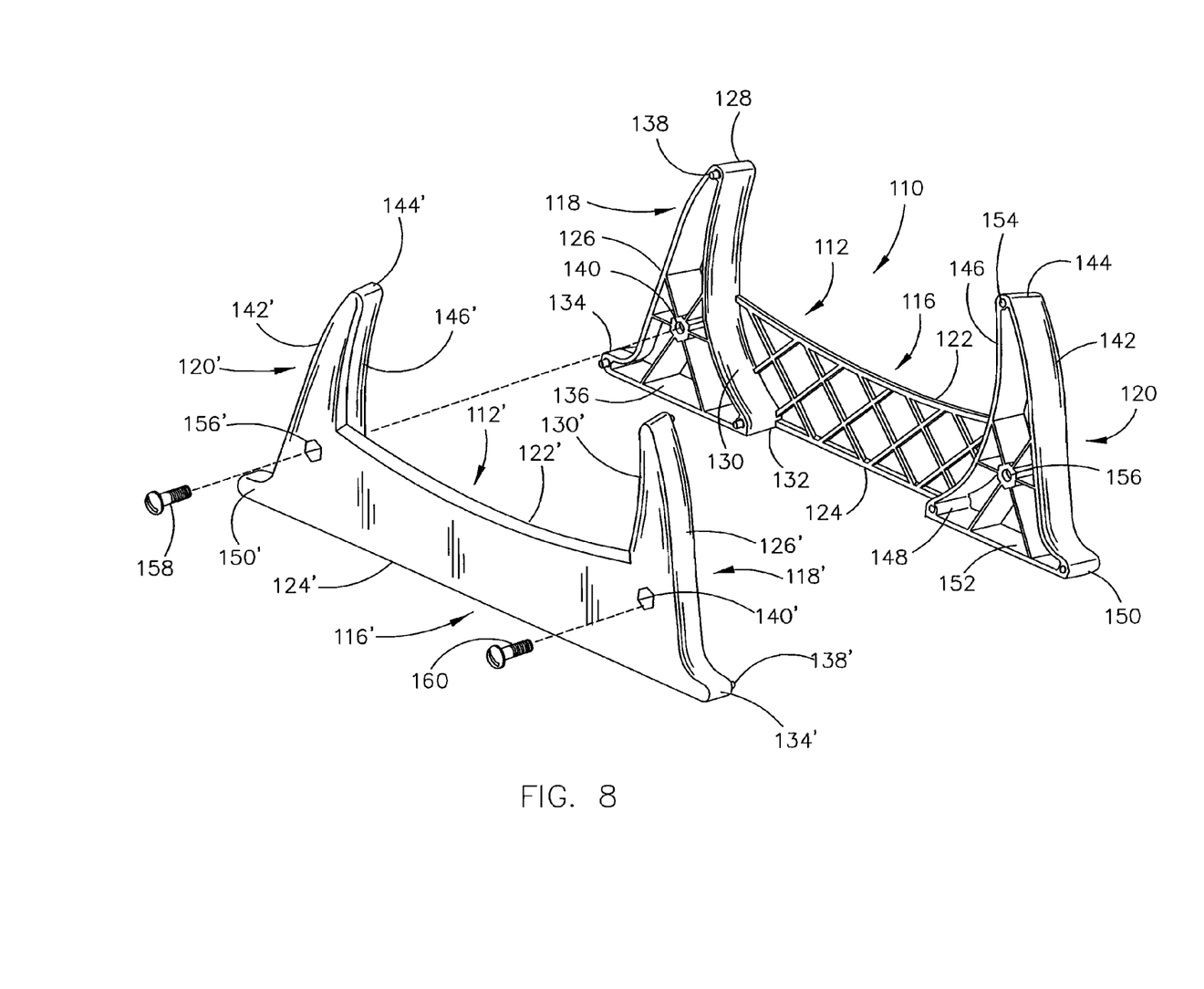
FIG. 8 is an exploded perspective view of one embodiment of the wheel guard of the present invention.
Figure 9:
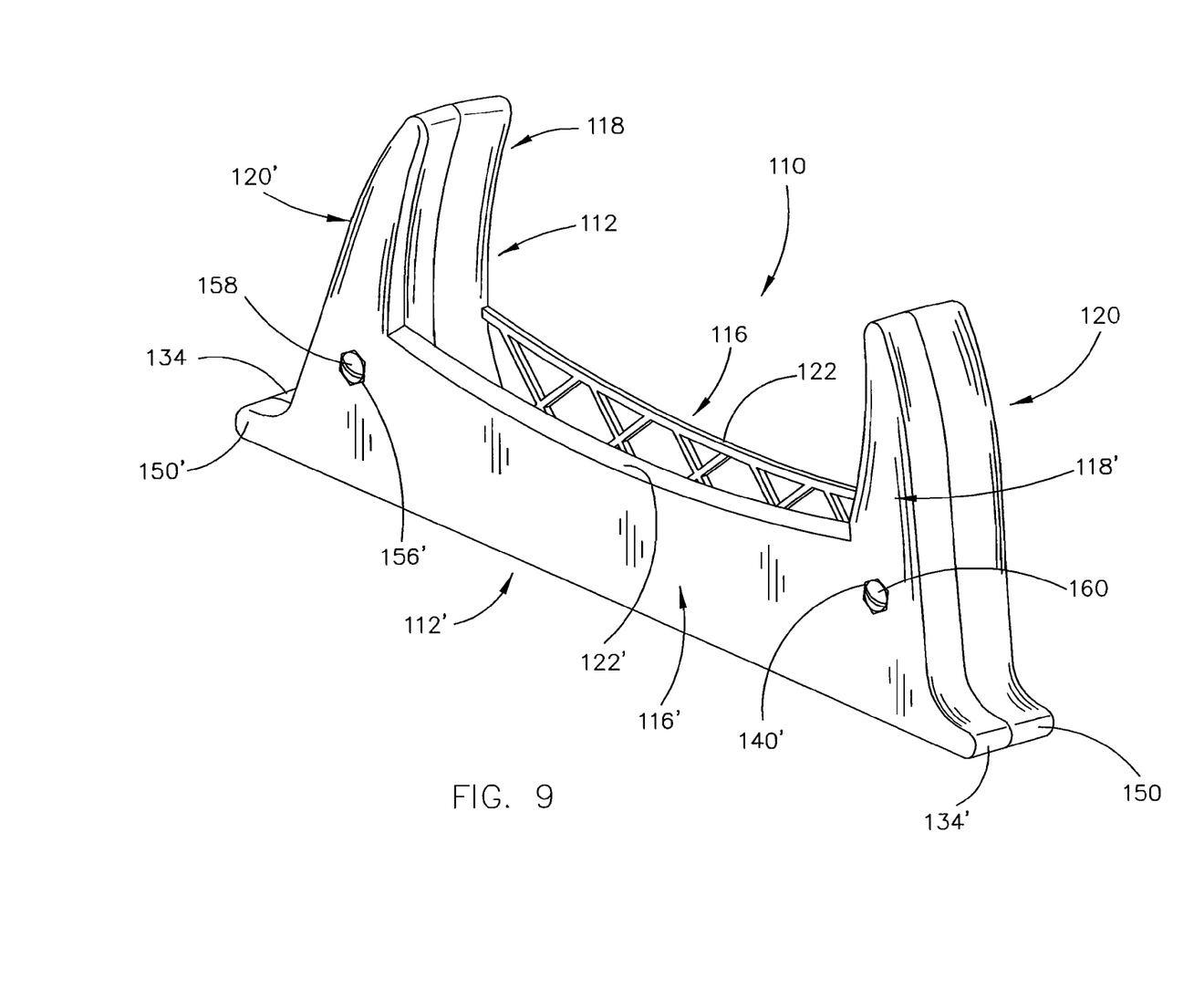
FIG. 9 is a perspective view of the embodiment of FIG. 8.
Figure 10:
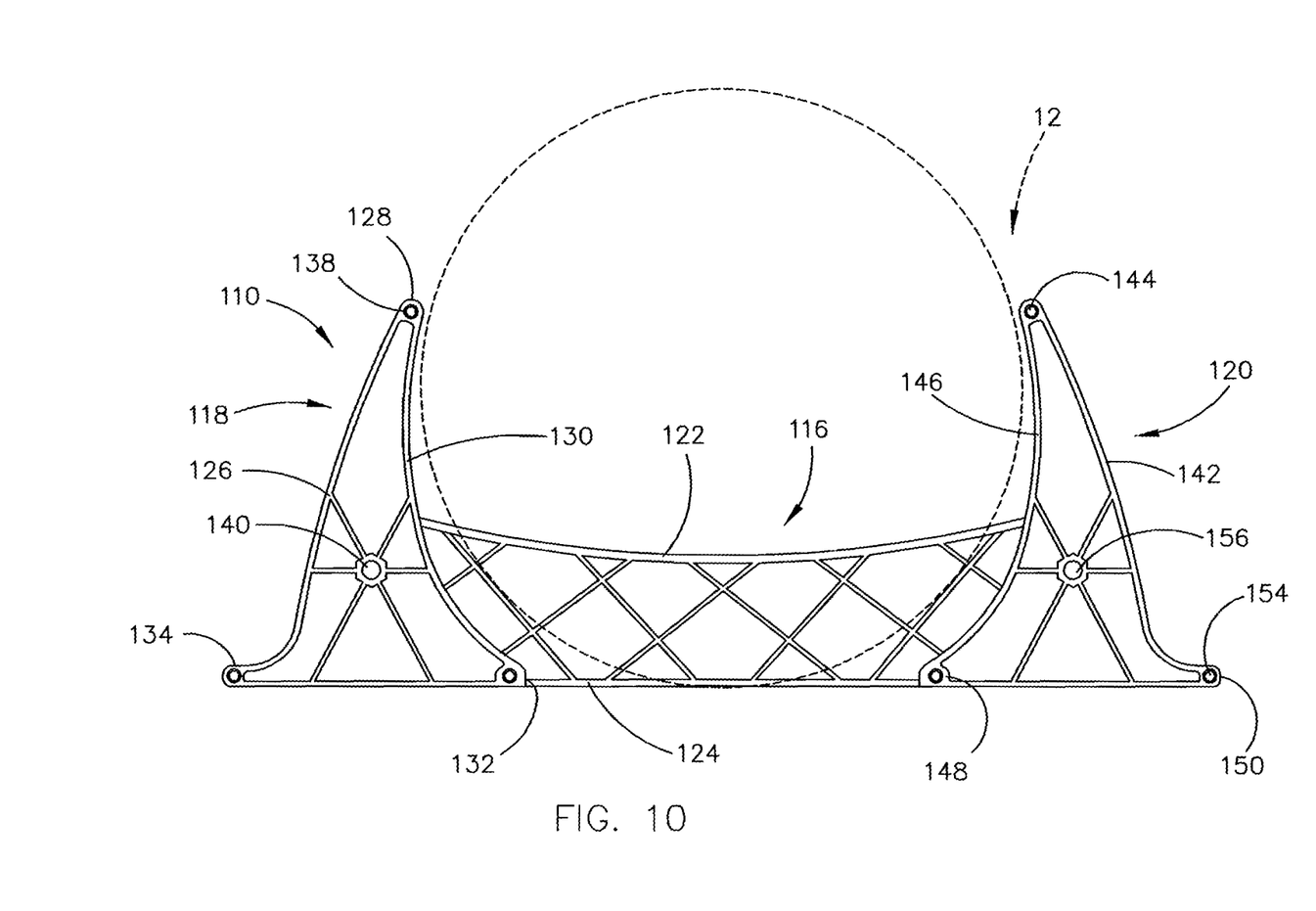
FIG. 10 is a side view of one of the components of the embodiment of FIG. 8.

Wheel guard 110 includes a first side member 112 and a second side member 112'. Side member 112 is of one-piece molded construction and includes an upstanding base portion 116, a first end portion or member 118 and a second end portion or member 120. Base portion 116 has an upper end 122 and a lower end 124. End portion 118 includes a curved outer wall 126, an upper end 128, a curved inner wall 130 which has a lower end 132. The lower end of outer wall 126 defines a bumper 134. End portion 118 also includes a horizontally disposed bottom wall 136. End portion 118 has a plurality of pegs 138 which extend outwardly therefrom. End portion 118 also has a horizontally disposed bolt opening 140 formed therein.

End portion 120 includes a curved outer wall 142, an upper end 144, a curved inner wall 146 which has a lower end 148. The lower end of outer wall 142 defines a bumper 150. End portion 120 also includes a horizontally disposed bottom wall 152. End portion 120 has a plurality of peg openings 154 formed therein. End portion 120 also has a horizontally disposed bolt opening 156 formed therein.

The second side member 112' is identical to side member 112 and will not be described in detail for purposes of conciseness. Structure on the second side member 112' which corresponds to structure or side member 112 will be designated by "'". The only difference between side members 112 and 112' is that one of the side members may have a greater thickness than the other side member to accommodate wheels of greater widths or thicknesses.

The side members 112 and 112' are assembled to form the wheel guard 110 as will now be described. The side members 112 and 112' are positioned together so that the bolt openings 156' and 140' in side member 112' register with the bolt openings 140 and 156 in side member 112. At that time, the pegs 138 in end portion 118 will be received by the peg openings in end portion 120' of side member 112 and the pegs in end portion 118' of side member 112' will be received in the peg openings 154 in end portion 120 of side member 112. A round headed bolt 158 is then inserted into bolt opening 156' and extends through bolt opening 140 in end portion 118 of side member 112 for threadable connection to a hexagonal nut positioned in the outer end of bolt opening 140. The bolt 158 is then tightened onto the nut in the outer end of bolt opening 140. A round headed bolt 160 is then inserted into bolt opening 140' and extended through bolt opening 156 for threadable connection to a hexagonal nut positioned in the outer end of bolt opening 156. The bolt 160 is then tightened onto the nut in the outer end of the bolt opening 156.

Figure 12:
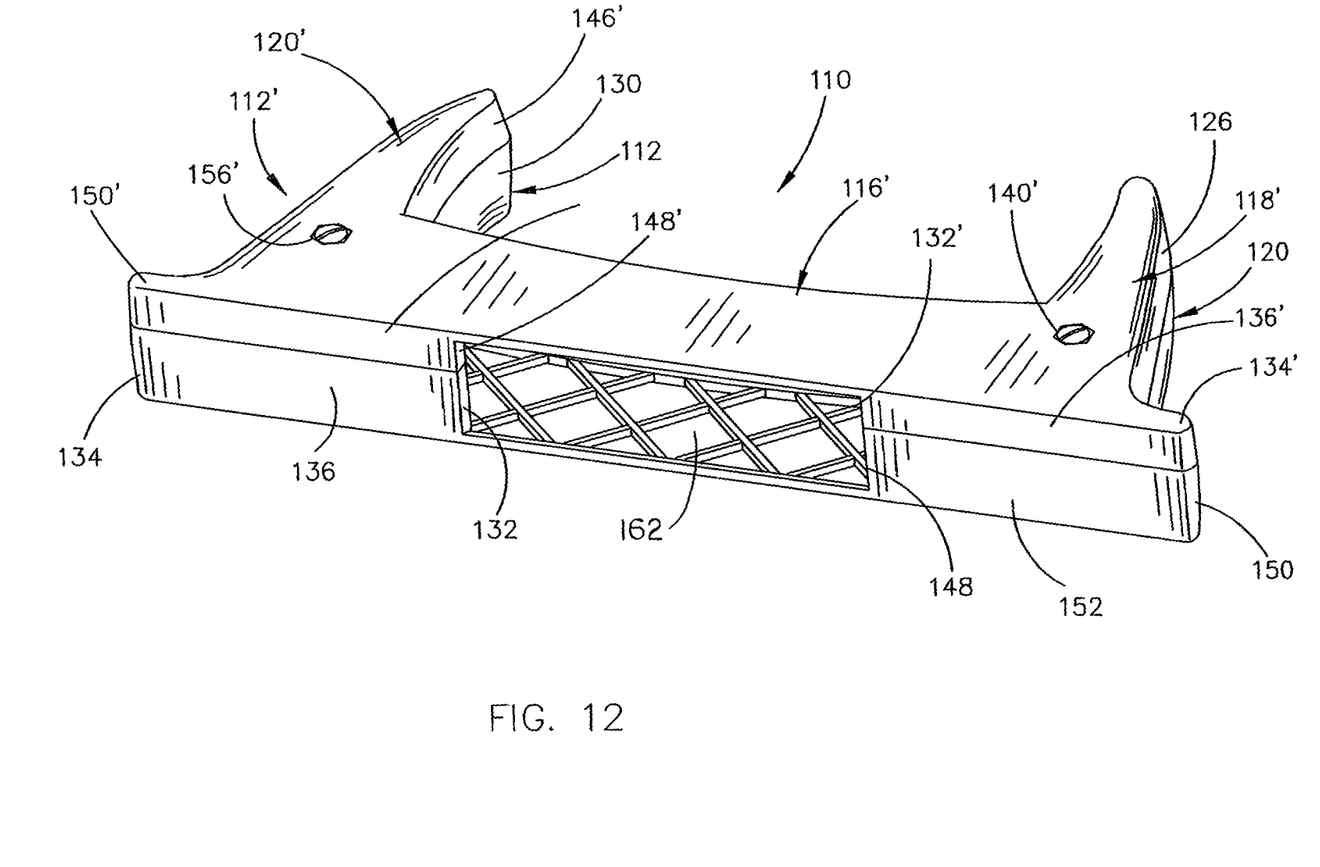
FIG. 12 is a bottom perspective view of the one-piece wheel guard of FIG. 11.

When the side members 112 and 112' are assembled as seen in FIG. 12, a rectangular opening 162 is created. The width of the opening 162 is sufficient to permit the lower end of the wheel 12 to pass therethrough. The length of the rectangular opening 162 is much less than the diameter of the wheel 12 to restrict the upward movement of the guard 110 with respect to the wheel 12 and the machine 15.

Figure 13:
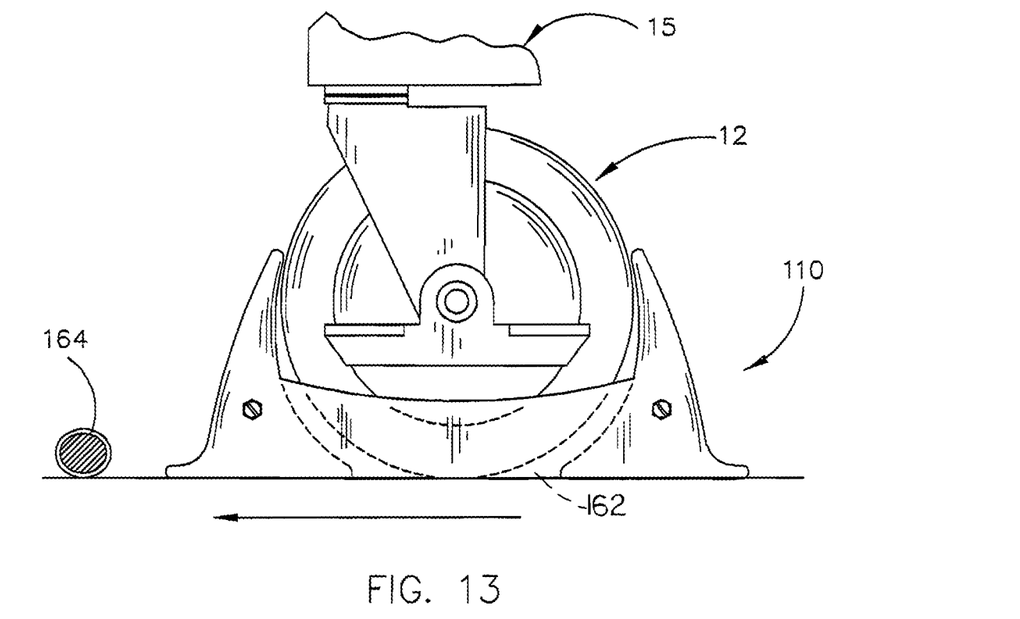
FIG. 13 is a side elevational view of the embodiment of FIG. 9 mounted on a wheel.

The guard 110 is attached to the wheel 12 by raising the wheel 12 from the supporting surface so that the guard 110 may be positioned below the wheel 12. The wheel 12 is then lowered into the guard with the upper ends of the end portions 118, 120' and 118' and 120 of the guard flexing slightly outwardly so that the wheel 12 may be positioned in the guard 110 as seen in FIG. 13. Inasmuch as the distance between the upper ends of the end portions is less than the diameter of the wheel 12, the guard 110 will move upwardly with the wheel 12 and will remain attached thereto as described herein above.

Figure 14:
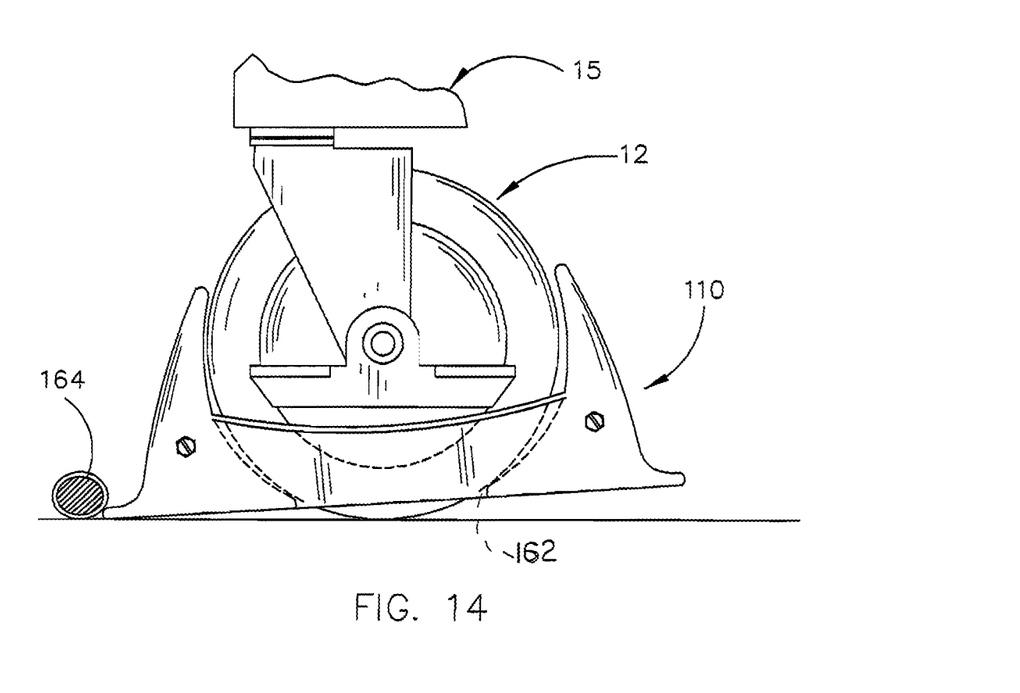
FIG. 14 is a side elevational view of the embodiment of FIG. 9 illustrating the movement of the wheel guard as the wheel guard engages a cable, wire, etc.

The length of the rectangular opening 162 is such that the lower end of the wheel 12 may pass therethrough to engage the supporting surface as seen in FIG. 13. If the leading edge of the guard 110 should strike an obstruction 164 as seen in FIG. 14, the guard 110 will not ride upwardly over the obstruction 164, but the trailing end of the guard 110 will tip upwardly slightly as seen in FIG. 14 with the ends of the rectangular opening 162 engaging the wheel 12 to limit the upward movement of the guard 110.

The wheel guard 210 of FIG. 11 is identical to the wheel guard 110 except that the wheel guard 210 is of a unitary one-piece molded construction.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A guard for a wheel rotatably mounted on a machine or appliance with the wheel having a horizontal axis, a first side, a second side, an upper and a lower end, comprising:
   an upstanding first side portion having a first end, a second end, an upper end, a lower end, an inner side and an outer side;
   an upstanding second side portion having a first end, a second end, an upper end, a lower end, an inner side and an outer side;
   said first side portion being configured to be positioned at the first side of the wheel;
   said second side portion being configured to be positioned at the second side of the wheel;
   an upstanding first end portion extending between said first ends of said first and second side portions;
   said first end portion having an upper end, a lower end, a first side, a second side, a curved outer wall portion with upper and lower ends, and a curved inner wall portion with upper and lower ends;
   said curved outer wall portion of said first end portion extending downwardly and outwardly from its said upper end to its said lower end;
   said curved inner wall portion of said first end portion extending downwardly and inwardly from its said upper end to its said lower end;
   said curved inner wall of said first end portion being configured to be positioned adjacent the wheel;
   an upstanding second end portion extending between said second ends of said first and second side portions;
   said second end portion having an upper end, a lower end, a first side, a second side, a curved outer wall portion with upper and lower ends, and a curved inner wall portion with upper and lower ends;
   said curved outer wall portion of said second end portion extending downwardly and outwardly from its said upper end to its said lower end;
   said curved inner wall of said second end portion being configured to be positioned adjacent the wheel;
   said upper ends of said first and second end portions dwelling in a plane above the horizontal axis of the wheel;
   said upper ends of said first and second end portions being spaced-apart a distance which is less than the diameter of the wheel whereby upward movement of the wheel will cause the wheel guard to move upwardly therewith;
   said lower ends of said inner wall portions of said first and second end portions and said first and second side portions defining a rectangular opening having a length and width;
   said length of said rectangular opening being less than the diameter of the wheel;
   said rectangular opening being configured to partially receive the lower end of the wheel therein; and
   said length of said rectangular opening being configured to restrict the upward movement of the guard with respect to the wheel.

2. The guard of claim 1 wherein said first side portion, said second side portion, said first end portion and said second end portion are of unitary one-piece construction.

3. The guard of claim 1 wherein the guard is comprised of a plurality of components secured together.

4. The guard of claim 1 wherein the guard is of two-piece construction with the two pieces thereof being secured together.

5. A guard for a wheel rotatably mounted on a machine or appliance with the wheel having a horizontal axis, a first side, a second side, an upper and a lower end, comprising:

an upstanding first side portion having a first end, a second end, an upper end, a lower end, an inner side and an outer side;

said first side portion being configured to be positioned at the first side of the wheel;

an upstanding first end portion at said first end of said first side portion;

said first end portion having an upper end, a lower end, a first side, a second side, a curved outer wall portion with upper and lower ends, and a curved inner wall portion with upper and lower ends;

said curved outer wall portion of said first end portion extending downwardly and outwardly from its said upper end to its said lower end;

said curved inner wall portion of said first end portion extending downwardly and inwardly from its said upper end to its said lower end;

said curved inner wall of said first end portion being configured to be positioned adjacent the wheel;

an upstanding second end portion at said second end of said first side portion;

said second end portion having an upper end, a lower end, a first side, a second side, a curved outer wall portion with upper and lower ends, and a curved inner wall portion with upper and lower ends;

said curved outer wall portion of said second end portion extending downwardly and outwardly from its said upper end to its said lower end;

said curved inner wall of said second end portion being configured to be positioned adjacent the wheel;

said upper ends of said first and second end portions dwelling in a plane above the horizontal axis of the wheel;

said upper ends of said first and second end portions being spaced-apart a distance which is less than the diameter of the wheel whereby upward movement of the wheel will cause the wheel guard to move upwardly therewith;

said lower ends of said inner wall portions of said first and second end portions and said first and second side portions defining a rectangular opening having a length and width;

said length of said rectangular opening being less than the diameter of the wheel;

said rectangular opening being configured to partially receive the lower end of the wheel therein;

an upstanding second side portion having a first end, a second end, an upper end, a lower end, an inner side and an outer side;

said second side portion being configured to be positioned at the second side of the wheel;

an upstanding third end portion at said first end of said second side portion;

said third end portion having an upper end, a lower end, a first side, a second side, a curved outer wall portion with upper and lower ends, and a curved inner wall portion with upper and lower ends;

said curved outer wall portion of said third end portion extending downwardly and outwardly from its said upper end to its said lower end;

said curved inner wall portion of said third end portion extending downwardly and inwardly from its said upper end to its said lower end;

said curved inner wall portion of said third end portion being configured to be positioned adjacent the wheel;

an upstanding fourth end portion at said second end of said second side portion;

said fourth end portion having an upper end, a lower end, a first side, a second side, a curved outer wall portion with upper and lower ends, and a curved inner wall portion with upper and lower ends;

said curved outer wall portion of said fourth end portion extending downwardly and outwardly from its said upper end to its said lower end;

said curved inner wall portion of said fourth end portion extending downwardly and inwardly from its said upper end to its said lower end;

said curved inner wall portion of said fourth end portion being configured to be positioned adjacent the wheel;

said upper ends of said third and fourth end portions dwelling in a plane above the horizontal axis of the wheel;

said upper ends of said first, second, third and fourth end portions being spaced-apart a distance which is less than the diameter of the wheel whereby upward movement of the wheel will cause the wheel guard to move upwardly therewith;

said lower ends of said inner wall portions of said first, second, third and fourth end portions and said first and second side portions defining a rectangular opening having a length and width;

said rectangular opening being configured to partially receive the lower end of the wheel therein; and said length of said rectangular opening being configured to restrict the upward movement of the guard with respect to the wheel.

* * * * *